(No Model.)

H. J. DOUGHTY.
PNEUMATIC TIRE.

No. 524,105. Patented Aug. 7, 1894.

Witnesses.
Fred S. Greenleaf.
Thomas F. Drummond.

Inventor.
Henry J. Doughty,
by Crosby & Gregory
Attys.

UNITED STATES PATENT OFFICE.

HENRY J. DOUGHTY, OF PROVIDENCE, RHODE ISLAND.

PNEUMATIC TIRE.

SPECIFICATION forming part of Letters Patent No. 524,105, dated August 7, 1894.

Application filed September 4, 1893. Serial No. 484,731. (No model.)

*To all whom it may concern:*

Be it known that I, HENRY J. DOUGHTY, of Providence, county of Providence, State of Rhode Island, have invented an Improvement in Pneumatic Tires, of which the following description, in connection with the accompanying drawings, is a specification, like letters on the drawings representing like parts.

Pneumatic or inflatable tires have come into very general use for bicycles, on account of their great cushioning properties, but the liability of such tires to be punctured and thereby rendered useless for the time is a great objection. For this reason many kinds of tires have been devised having as their object either the prevention of puncturing, or the adaptability to be easily repaired when punctured. In the first instance the tires are heavy or very expensive, while in the other case the repairing invariably requires time and considerable skill.

This invention has for its object the production of a pneumatic or inflatable tire of simple construction, cheap, not easily punctured and requiring no skilled labor to repair if actually punctured.

In accordance therewith my invention consists in the combination, in a pneumatic tire, of an inflatable tube, with a jacketing strip therefor having separable free longitudinal edges overlapped at the outer periphery of said tube, and a detachable annular concavo-convex tread adapted to cover said overlapped free edges, substantially as will be described.

Other features of my invention will be hereinafter described and particularly pointed out in the claims.

Figure 1:
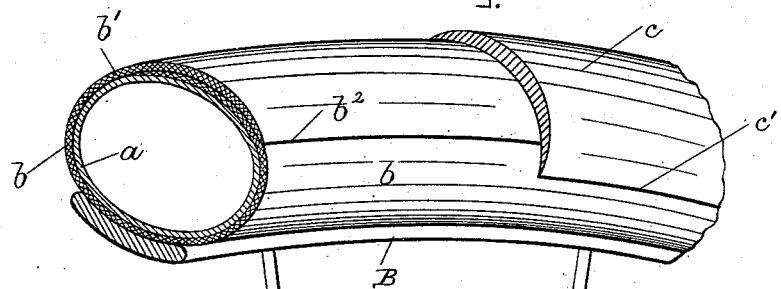
Figure 2:
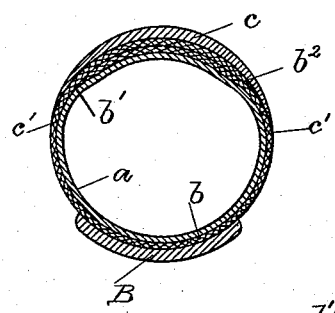
Figure 3:
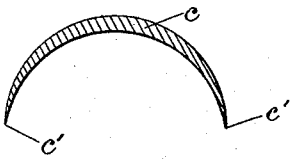
Figure 4:
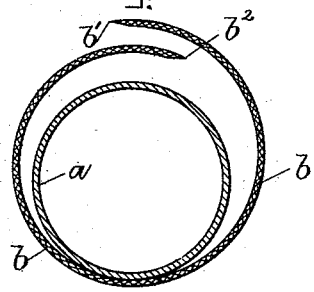
Figure 5:
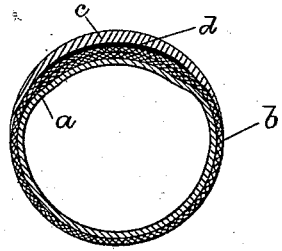
Figure 6:
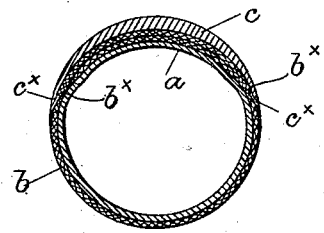

Figure 1 is a perspective view of a portion of a tire embodying my invention, the detachable tread being partly broken away. Fig. 2 is a cross section of the tire shown in Fig. 1. Fig. 3 is a cross section of the tread, detached. Fig. 4 is a cross section of the inflatable tube and the jacketing strip, the longitudinal edges of the latter being separated; and Figs. 5 and 6 are sectional views of modified forms of my invention, to be described.

The rim or felly B of the wheel is of usual construction, having a grooved or concave face to receive the tire, the latter consisting essentially of an inflatable tube resting in the face of the rim or felly, a detachable annular concavo-convex tread held upon the outer periphery of the tube, and preferably a jacketing or protecting strip for the tube, the longitudinal free edges thereof being overlapped by the detachable tread.

The inflatable tube $a$, preferably of the well known endless form, constructed of rubber or other suitable material, is provided with any suitable air inlet, not shown, for inflating it, and I have herein shown a protecting jacket $b$, of preferably textile material, such as canvas, in strip form, resting in the face of the rim or felly B, to which it may be secured by cement or other desired means. The jacketing strip is brought up around the tube $a$, to surround it more or less, the longitudinal edges $b'$, $b^2$ of the strip being separable and free to move with relation to each other, said edges overlapping each other at the outer periphery of the inflatable tube. Before the tube is inflated the edges of the jacketing strip are overlapped or drawn thereover, and the detachable tread $c$ applied, the concave inner face thereof resting upon the jacketing strip when overlapped, as in Figs. 1 and 2.

The detachable tread $c$ is shown as annular in form, and concavo-convex in cross section, see Figs. 2 and 3, made preferably of molded rubber, the shape of the tread presenting the thickest portion thereof where the wear is greatest, the thickness gradually diminishing to the edges $c'$. When the tread is in position to cover the overlapped longitudinal edges of the jacketing strip the tube $a$ is fully inflated, and as it increases in size the jacket is held firmly between it and the detachable tread, the latter being held securely in place by the inflated tube.

The jacket $b$ protects the inflatable tube between the rim or felly and the detachable tread, the latter being of sufficient width to take up all wear.

From the foregoing it will be seen that if the tube should be punctured it would immediately collapse to a greater or less extent, loosening the tread $c$, which could be wholly or partially removed, and the longitudinal edges of the jacketing strip be easily separated until the puncture was found. After repairing the tube the edges would be readjusted, the tread replaced, and the tube inflated, the whole operation requiring very little time and no skilled labor.

Should it be found desirable to provide additional means to prevent puncturing, a guard $d$ composed of some refractory material, textile or otherwise, may be interposed between the tread and the inflatable tube, as shown in Fig. 5.

In Fig. 6 I have shown the concave face of the tread notched as at $c^x$, to engage suitable projections $b^x$ in the outer side of the jacketing strip, to thereby form a locking device between the detachable tread and the jacketing strip. The notched portions may be in the tread and the projections on the jacketing strip, or vice versa, as will be obvious, and they may extend for a greater or less distance longitudinally upon each.

My invention is not restricted to the particular amount, more or less, by which the free longitudinal edges of the jacketing strip overlap, for while I prefer to make said edges overlap one another, it would come entirely within the scope of my invention if I should make the said edges abut, or nearly approach each other, so long as the detachable tread covers said edges when in position, and said jacketing strip constitutes in itself a cover or protection for the inner inflatable tube where the same is covered by the tread.

By overlapping the free longitudinal edges of the jacketing strip and thereafter inflating the tube within it, it is possible to make in the jacketing strip a very tight close joint, for the overlapped edges of the said strip are pinched firmly together, one on or against the other, between the exterior of the inner tube and the interior of the concavo-convex tread; and so also by overlapping the edges of the jacketing strip outside the inner tube, greater protection of the tube at that point by the jacketing strip is afforded in a cheap and substantial manner.

I claim—

1. In a pneumatic tire, the combination with an inflatable inner tube, of a surrounding jacket made as a strip having its separable longitudinal free edges overlapped one on the other, and an annular detachable concavo-convex tread adapted to cover said overlapped edges, substantially as described.

2. In a pneumatic tire, the combination with an inflatable inner tube, and a surrounding jacketing strip having its free longitudinal edges overlapped, as shown, at the outer periphery of said tube, of a detachable annular concavo-convex tread adapted to cover said overlapped edges, and a guard interposed between said tread and said tube, to operate, substantially as described.

3. In a pneumatic tire, an inflatable inner tube, and a surrounding jacketing strip having its separable longitudinal edges overlapped outside said tube, combined with a detachable concavo-convex tread, and a locking device intermediate said tread and jacketing strip to connect said tread and strip at opposite sides of the overlapped edges of the strip, substantially as described.

In testimony whereof I have signed my name to this specification in the presence of two subscribing witnesses.

HENRY J. DOUGHTY.

Witnesses:
JOHN C. EDWARDS,
FREDERICK L. EMERY.